United States Patent
Nagata et al.

[19]

[11] Patent Number: 6,152,391
[45] Date of Patent: Nov. 28, 2000

[54] WEBBING RETRACTOR

[75] Inventors: Tomonori Nagata; Seiji Hori, both of Aichi-ken, Japan

[73] Assignee: Kabushiki Kaisha Tokai-Rika-Denki-Seisakusho, Aichi-ken, Japan

[21] Appl. No.: 09/357,207

[22] Filed: Jul. 20, 1999

[30] Foreign Application Priority Data

Feb. 16, 1999 [JP] Japan .................................. 11-037090
May 7, 1999 [JP] Japan .................................. 11-127050

[51] Int. Cl.[7] .................................................. B60R 22/46
[52] U.S. Cl. ............................................................ 242/374
[58] Field of Search ................................ 242/374, 376.1; 280/806; 297/478, 480

[56] References Cited

U.S. PATENT DOCUMENTS

| 5,624,083 | 4/1997 | Modinger et al. ....................... 242/374 |
| 5,842,344 | 12/1998 | Schmid .................................... 242/374 |
| 5,906,327 | 5/1999 | Chamings ................................ 242/374 |

*Primary Examiner*—John M. Jillions
*Attorney, Agent, or Firm*—Nixon Peabody LLP; Thomas W. Cole

[57] ABSTRACT

A plurality of protrusions are formed on an inner peripheral portion of a bearing main body that supports a large diameter shaft portion of a take-up shaft. These protrusions are in line contact with an outer peripheral portion of the large diameter shaft portion, which allows the bearing main body to support the large diameter shaft portion indirectly via the protrusions. As the protrusions are in line contact with the large diameter shaft portion, the contact area is very small and the frictional resistance between the protrusions and the large diameter shaft portion causes the protrusions to undergo plastic deformation easily. Thus, the resistance that hinders the rotation of the large diameter shaft portion is decreased and a share that is served for the rotation of the take-up shaft by the pressure of gas is increased, thereby providing a webbing retractor that can serve efficiently for taking up a webbing belt.

20 Claims, 2 Drawing Sheets

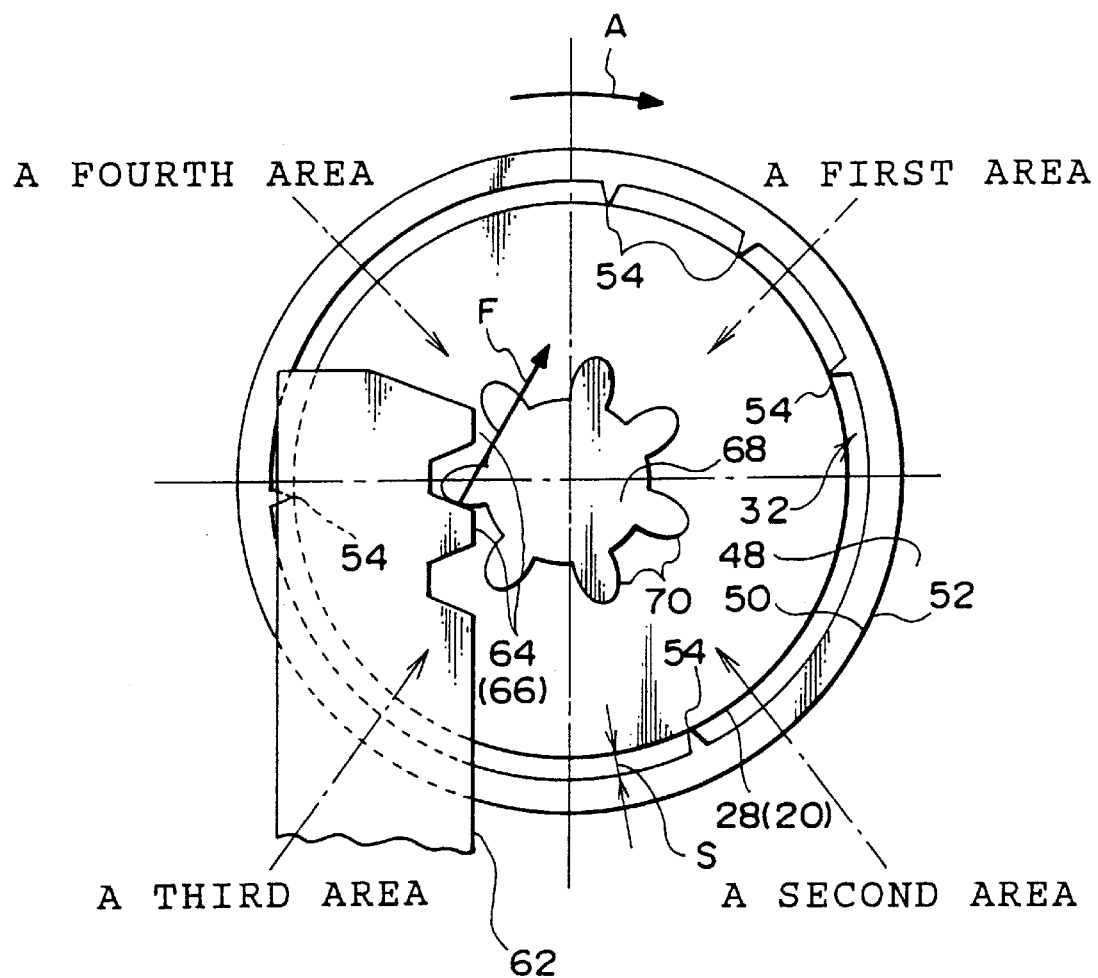

WEBBING RETRACTOR

BACKGROUND OF THE INVENTION

1. Field of the Invention

The present invention relates to a webbing retractor in a seat belt device which restricts a vehicle occupant by a webbing belt, and more particularly, to a webbing retractor which is provided with what is known as a pretensioner for forcefully taking up a predetermined amount of the webbing belt in a sudden braking state.

2. Description of the Related Art

In today's vehicles, what is known as a seat belt device is installed that restricts a vehicle occupant by an elongated band-like webbing belt. Further, among these seat belt devices, there is a type which is provided with what is known as a pretensioner for rotating a take-up shaft forcefully by a predetermined amount in the direction in which the webbing belt is taken up so that a predetermined amount of the webbing belt is forcefully taken up, thereby not only temporarily increasing the restraining force of the webbing belt but also restricting the forward movement of the occupant in the vehicle when the vehicle executes a sudden deceleration.

This type of pretensioner is provided with a cylinder that contains agents such as a gas generating agent for rapidly generating gas when it is ignited, and an igniting agent for igniting the gas generating agent. Further, a piston is contained inside the cylinder. One end of a rack bar in the longitudinal direction thereof is fixed at one end of the piston. A pinion gear which is formed at one end of a take-up shaft and coaxially therewith is located by the side of the other end of the rack bar in the longitudinal direction thereof. The rack bar is normally separated from the pinion gear, and is able to mesh with the pinion gear by moving in a direction in which it approaches the pinion gear along the longitudinal direction of the rack bar.

When detecting means such as an acceleration sensor detects a sudden deceleration state of the vehicle, the igniting agent ignites the gas generating agent so as to rapidly generate gas. The gas then causes the piston to slide inside the cylinder. When the piston slides, the rack bar moves integrally along the longitudinal direction thereof in the direction in which it approaches the pinion gear and meshes with the pinion gear, thereby rotating the pinion gear. The rotation of the pinion gear causes the take-up shaft to rotate, and the webbing belt is taken up by a length corresponding to the rotation amount of the take-up shaft.

The take-up shaft described above is rotatably supported by a bearing portion provided in a housing normally formed from a metal plate or a like. Generally, the bearing portion is in surface contact with a surface of the outer periphery of the take-up shaft along the direction of the outer periphery thereof. Thus, if the take-up shaft is rotated, for example, in a state in which the take-up shaft is made eccentric by the rack bar meshing with the pinion gear, the frictional resistance is increased because the take-up shaft rotates in a state in which it is pressed against the inner peripheral portion of the bearing portion. The force that forces the pretensioner to rotate the take-up shaft via the rack bar and the pinion gear is converted into thermal energy by this frictional resistance, thereby decreasing the portion of the force provided to actually rotate the take-up shaft. Particularly, when synthetic resin or the like, whose rigidity is lower than that of the metal material that constitutes the take-up shaft, is used for the bearing portion in an attempt to lighten the weight of the bearing portion, the above frictional resistance causes the inner peripheral portion of the bearing portion to undergo plastic deformation and the surface of the inner periphery of the bearing portion to become rough, which further increases the frictional resistance.

In this way, in a webbing retractor provided with a conventional pretensioner, the pretensioner's force for rotating the take-up shaft is decreased by the frictional resistance. Accordingly, it has been imperative to allow for such a decrease and to generate a larger amount of gas so as to compensate for it. Thus, the device has had to be large in size.

SUMMARY OF THE INVENTION

In view of the above-described circumstances, it is an object of the present invention to provide a webbing retractor that can take up a webbing belt forcefully and efficiently.

A webbing retractor according to a first aspect of the present invention comprises a cylinder to which gas is supplied under a predetermined condition, a piston which is slidably provided within the cylinder, and which slides within the cylinder due to the pressure of the gas, a take-up shaft to which a base end portion of an elongated band-like webbing belt for restraining the body of an occupant is fixed and which is urged in the taking-up direction in which the webbing belt is taken up, a pretensioner for rotating the take-up shaft toward the taking-up direction due to the sliding of the piston, bearing means whose inside diameter size is larger than the outside diameter size of the take-up shaft and which has an inner peripheral portion into which the take-up shaft is coaxially inserted, and a protrusion which is projectingly formed either on the inner peripheral portion of the bearing means protruding towards the outer peripheral portion of the take-up shaft (hereinafter, sometimes referred to as "the one"), or on the outer peripheral portion of the take-up shaft protruding towards the inner peripheral portion of the bearing means (hereinafter, sometimes referred to as "the other one"), and which has a very small portion of itself relative to the surface area of the opposite peripheral portion that contacts the opposite peripheral portion.

According to the webbing retractor described above, when the pretensioner is operated under the predetermined condition, for example, when the vehicle executes a sudden deceleration, the pretensioner causes the take-up shaft to rotate in the taking-up direction, thereby increasing the restraining force of the webbing belt on the body of the occupant.

In the meantime, in the present invention, the winding shaft is disposed inside the bearing means, and the protrusion, which is formed either on the inner peripheral portion of the bearing means protruding towards the outer peripheral portion of the take-up shaft, or on the outer peripheral portion of the take-up shaft protruding towards the inner peripheral portion of the bearing means, has a very small portion of itself relative to the surface area of the opposite peripheral portion that contacts the opposite peripheral portion, so that the winding shaft is supported by the bearing means.

The take-up shaft becomes eccentric when the external force along a radial direction of the take-up shaft is applied to the take-up shaft in a state in which the take-up shaft is rotated. As a result, the gap between the inner peripheral portion of the bearing means and the outer peripheral portion of the take-up shaft is shortened on the side in the direction of the displacement. At this point, the other one tries to deform the protrusion by pressing the protrusion while rotating relative to either one. However, as the point at which the protrusion is in contact with the other one is very small compared with the area of the other one on the side opposing either one, the pressing force is concentrated on the protrusion, thereby plastically deforming the protrusion with ease. In this way, as the protrusion undergoes plastic deformation easily, resistance of the protrusion to the rotation of the other one becomes relatively small, constituting less hindrance to the rotation of the take-up shaft. Therefore, the take-up shaft can be rotated smoothly even when the take-up shaft becomes eccentric.

Further, as the diameter size of the inner peripheral portion of the bearing means is larger than that of the outer peripheral portion of the take-up shaft, there is a space between the inner peripheral portion of the bearing means and the outer periphery of the take-up shaft by the side of the protrusion along the rotational direction of the take-up shaft. As described above, when the take-up shaft is rotated in a state in which it is eccentric, the protrusion is deformed plastically. Then, the plastically deformed portion of the protrusion is dragged in the rotational direction of the other one by the rotation of the other one relative to either one in such a manner that the protrusion is trapped into the above-mentioned space. Therefore, the plastically deformed portion will not hinder the rotation of the take-up shaft, which also facilitates the smooth rotation of the take-up shaft.

It should be noted that in the present invention, the above effect is basically produced if the point at which the protrusion comes into contact with the other one is relatively very small in relation to the area of the other one in the portion opposing either one. Therefore, the mode of contact of the protrusion to the other one may be any one of the surface contact, the line contact and the point contact. Judging from the viewpoint that the smaller contact portion is preferable, however, the line contact is preferable to the surface contact.

A webbing retractor according to a second aspect of the present invention comprises a cylinder to which gas is supplied under a predetermined condition, a piston which is slidably provided within the cylinder, and which slides within the cylinder due to the pressure of the gas, a take-up shaft including a shaft main body, to which a base end portion of an elongated band-like webbing belt for restraining the body of an occupant is fixed and which is urged in the taking-up direction in which the webbing belt is taken up, a pretensioner which has a rotator that is mechanically connected to the take-up shaft at least due to the sliding of the piston and which causes the rotator to rotate in a specific direction due to the sliding of the piston so that the take-up shaft is rotated in the taking-up direction, bearing means whose inside diameter size is larger than the outside diameter size of the take-up shaft and inside of which the rotator is disposed, and a protrusion which is projectingly formed either on the inner peripheral portion of the bearing means protruding towards the outer peripheral portion of the rotator, or on the outer peripheral portion of the rotator disposed inside and protruding towards the inner peripheral portion of the bearing means, and which has a very small portion of itself relative to the surface area of the opposite peripheral portion that contacts the opposite peripheral portion.

According to the webbing retractor described above, when the pretensioner is operated under the predetermined condition, for example, when the vehicle executes a sudden deceleration, the rotator is caused to rotate in the specific direction. At least under the predetermined condition, the rotator is connected to the take-up shaft so as to impart the rotation of the rotator to the take-up shaft, and the rotator that rotates in the specific direction causes the take-up shaft to rotate in the taking-up direction. As a result, the restraining force of the webbing belt on the body of the occupant is increased.

In the meantime, in the present invention, the protrusion, which is formed either on the inner peripheral portion of the bearing means protruding towards the outer peripheral portion of the rotator, or on the outer peripheral portion of the rotator protruding towards the inner peripheral portion of the bearing means, has a very small portion of itself relative to the surface area of the opposite peripheral portion that contacts the opposite peripheral portion, so that the rotator is supported by the bearing means.

Further, the rotator becomes eccentric when the external force along a rotationally radial direction of the rotator is applied to the rotator in a state in which the rotator is rotated. As a result, the gap between the inner peripheral portion of the bearing means and the outer peripheral portion of the rotator is shortened on the side in the direction of the displacement. At this point, the other one tries to deform the protrusion by pressing the protrusion while rotating relative to either one. However, as the point at which the protrusion is in contact with the other one is very small compared with the area of the other one on the side opposing either one, the pressing force is concentrated on the protrusion, thereby plastically deforming the protrusion with ease. In this way, as the protrusion undergoes plastic deformation easily, resistance of the protrusion to the rotation of the other one becomes relatively small, constituting less hindrance to the rotation of the rotator. Therefore, the rotator can be rotated smoothly even when the rotator becomes eccentric.

Further, as the diameter size of the inner peripheral portion of the bearing means is larger than that of the outer peripheral portion of the rotator, there is a space between the inner peripheral portion of the bearing means and the outer periphery of the rotator by the side of the protrusion along the rotational direction of the rotator. As described above, when the rotator is rotated in a state in which it is eccentric, the protrusion is deformed plastically. Then, the plastically deformed portion of the protrusion is dragged in the rotational direction of the other one by the rotation of the other one relative to either one in such a manner that the protrusion is trapped into the above-mentioned space. Therefore, the plastically deformed portion will not hinder the rotation of the rotator, which also facilitates the smooth rotation of the rotator.

It should be noted that in the present invention, the above effect is basically produced if the point at which the protrusion comes into contact with the other one is relatively very small in relation to the area of the other one in the portion opposing either one. Therefore, the mode of contact of the protrusion to the other one may be any one of the surface contact, the line contact and the point contact. Judging from the viewpoint that the smaller contact portion is preferable, however, the line contact is preferable to the surface contact.

A webbing retractor according to a third aspect of the present invention is characterized in that in the first or second aspect, the protrusion is formed on the one that has the lower rigidity of the outer peripheral portion of the one disposed inside the bearing means, of the winding shaft and the rotator, and the inner peripheral portion of the bearing means.

According to the webbing retractor described above, as the protrusion is formed on the one that has the lower rigidity of the outer peripheral portion of the one disposed inside the bearing means, of the winding shaft and the rotator, and the inner peripheral portion of the bearing means, when the take-up shaft or the rotator is rotated in a state in which it is eccentric, the protrusion inevitably undergoes plastic deformation by the difference in rigidity of the two. Therefore, the other one on which the protrusion is not formed because the rigidity thereof is relatively high is not basically deformed plastically by the relative rotation to the protrusion. Thus, the effect that the first aspect or the second aspect of the present invention produces is ensured further more, thereby resulting in the smooth rotation of the take-up shaft or the rotator.

A webbing retractor according to a fourth aspect of the present invention is characterized in that in the first through third aspects, the pretensioner is structured to include a pinion gear which is able to rotate around the shaft thereof and which is mechanically connected to the one disposed inside the bearing means of the winding shaft and the rotator in a state in which the pinion gear is rotated at least in a specific direction, so as to impart the rotation in the specific direction to the one disposed inside the bearing means for rotating the take-up shaft in the taking-up direction, and a rack bar which is provided so as to be able to mesh with the pinion gear by a sliding movement thereof in a tangential direction with respect to the outer periphery of the one disposed inside the bearing means and meshes with the pinion gear by being forced to slide in the tangential direction under the predetermined condition so as to rotate the pinion gear in the specific direction, and the protrusion is formed on the inner peripheral portion of the bearing means on the opposite side from the rack bar via the one disposed inside the bearing means and on the side opposed to the outer peripheral portion of the take-up shaft along a direction perpendicular to a surface on which the rack bar meshes with the pinion gear.

In the webbing retractor described above, when the rack bar is slid by sliding means of which the pretensioner is composed, the rack bar meshes with the pinion gear and rotates the pinion gear. As a result, the take-up shaft is rotated in the direction in which the webbing belt is taken up.

In the meantime, the rack bar rotates the pinion gear when the gear of the rack bar presses the gear of the pinion gear. Then, since the rack bar presses the pinion gear in the direction of a surface on which the rack bar meshes with the pinion gear, the pinion gear becomes eccentric along the pressing direction thereof. At this point, in the present webbing retractor, the protrusion is formed in the position on the side opposite to the rack bar via the one disposed inside the bearing means of the take-up shaft and the rotator and opposing the outer peripheral portion of the take-up shaft along the perpendicular direction of the meshing surface described above, in other words, corresponding to the direction in which the one disposed inside the bearing means becomes eccentric when the rack bar meshes with the pinion gear and the pinion gear becomes eccentric. Thus, when the pinion gear becomes eccentric, the outer peripheral portion of the one disposed inside the bearing means presses and deforms plastically the protrusion.

As described above, the take-up shaft can be rotated smoothly even when the one disposed inside the bearing means becomes eccentric, because the one disposed inside the bearing means presses and plastically deforms the protrusion when one disposed inside the bearing means rotates. Thus, particularly in the present webbing retractor, the take-up shaft can be rotated smoothly when the pretensioner is operated.

A webbing retractor according to a fifth aspect of the present invention comprises a cylinder to which gas is supplied under a predetermined condition, a piston which is slidably provided within the cylinder, and which slides within the cylinder due to the pressure of the gas, a take-up shaft including a shaft main body, to which a base end portion of an elongated band-like webbing belt for restraining the body of an occupant is fixed and which is urged in the taking-up direction in which the webbing belt is taken up, a pretensioner which has a cover including a housing portion housing a rotator that is mechanically connected to the take-up shaft at least due to the sliding of the piston for rotating in a specific direction so that the take-up shaft is rotated in the taking-up direction, and also including a bearing portion that is given higher rigidity than the housing portion and supports the rotator, in such a manner that the cover is connected to the housing portion for covering the rotator while the bearing portion supports the rotator, bearing means inside of which either the winding shaft or the rotator is disposed and whose inside diameter size is sufficiently larger than the outside diameter size of the one disposed inside of the take-up shaft and the rotator, and a protrusion which is projectingly formed either on the inner peripheral portion of the bearing means protruding towards the outer peripheral portion of the one disposed inside, or on the outer peripheral portion of the one disposed inside and protruding towards the inner peripheral portion of the bearing means, and which has a very small portion of itself relative to the surface area of the opposite peripheral portion that contacts the opposite peripheral portion.

According to the webbing retractor described above, when the pretensioner is operated so as to rotate the rotator in the specific direction, the rotator is mechanically connected to the take-up shaft, thereby rotating the take-up shaft in the taking-up direction. As a result, the restraining force of the webbing belt on the body of the occupant is increased.

In the meantime, in the present webbing retractor, one of the winding shaft and the rotator is disposed inside the bearing means, and the protrusion, which is formed either on the inner peripheral portion of the bearing means protruding towards the outer peripheral portion of the one disposed inside the bearing means, or on the outer peripheral portion of the one disposed inside the bearing means and protruding towards the inner peripheral portion of the bearing means, has a very small portion of itself relative to the surface area of the opposite peripheral portion that contacts the opposite peripheral portion, so that the one disposed inside the bearing means is supported by the bearing means.

The one disposed inside the bearing means becomes eccentric when the external force along a radial direction of the one disposed inside the bearing means is applied to the one disposed inside the bearing means in a state in which the one disposed inside the bearing means is rotated. As a result, the gap between the inner peripheral portion of the bearing means and the outer peripheral portion of the one disposed inside the bearing means is shortened on the side in the direction of the displacement. At this point, the other one tries to deform the protrusion by pressing the protrusion while rotating relative to either one. However, as the point at which the protrusion is in contact with the other one is very small compared with the area of the other one on the side opposing either one, the pressing force is concentrated on the protrusion, thereby plastically deforming the protrusion with ease. In this way, as the protrusion undergoes plastic deformation easily, resistance of the protrusion to the rotation of the other one becomes relatively small, constituting less hindrance to the rotation of the one disposed inside the bearing means. Therefore, the one disposed inside the bearing means can be rotated smoothly even when the one disposed inside the bearing means becomes eccentric.

Further, as the diameter size of the inner peripheral portion of the bearing means is larger than that of the outer peripheral portion of the one disposed inside the bearing means, there is a space between the inner peripheral portion of the bearing means and the outer periphery of the one disposed inside the bearing means by the side of the protrusion along the rotational direction of the one disposed inside the bearing means. As described above, when the one disposed inside the bearing means is rotated in a state in which it is eccentric, the protrusion is deformed plastically. Then, the plastically deformed portion of the protrusion is dragged in the rotational direction of the other one by the rotation of the other one relative to either one in such a manner that the protrusion is trapped into the above-mentioned space. Therefore, the plastically deformed portion will not hinder the rotation of the one disposed inside the bearing means, which also facilitates the smooth rotation of the one disposed inside the bearing means.

Moreover, in the present invention, the bearing means, which is formed in the cover covering the rotator and which supports the rotator, is given higher rigidity than the housing portion that houses the rotator constituting the pretensioner described above. In other words, if the strength (rigidity) sufficient to support the rotator is given to the bearing portion, the strength (rigidity) of the housing portion that merely houses the rotator does not need to be so high as that of the bearing portion. Accordingly, as in the present invention, when the bearing portion is given higher rigidity than the housing portion, relatively light material, which is also less expensive because of its low rigidity, can be used in the housing portion. For this reason, lightening of weight and reduction in cost of the pretensioner can achieved. As a result, lightening of weight and reduction in cost of the webbing retractor can be achieved.

It should be noted that in the present invention, the above effect is basically produced if the point at which the protrusion comes into contact with the other one is relatively very small in relation to the area of the other one in the portion opposing either one. Therefore, the mode of contact of the protrusion to the other one may be any one of the surface contact, the line contact and the point contact. Judging from the viewpoint that the smaller contact portion is preferable, however, the line contact is preferable to the surface contact.

Likewise, for the bearing portion in the present invention, as long as it can support the rotator, any structure can be used and the embodiment thereof is not limited. For example, when the portion that substantially supports the rotator is merely an opening, the bearing portion is naturally this opening, and the rigidity of the bearing portion in this case is the member of which the opening is formed (especially, a surrounding area of the opening on the member).

A webbing retractor according to a sixth aspect of the present invention comprises a cylinder to which gas is supplied under a predetermined condition, a piston which is slidably provided within the cylinder, and which slides within the cylinder due to the pressure of the gas, a take-up shaft including a shaft main body, to which a base end portion of an elongated band-like webbing belt for restraining the body of an occupant is fixed and which is urged in the taking-up direction in which the webbing belt is taken up, a pretensioner which has a cover including a housing portion housing both a rotator that is mechanically connected to the take-up shaft at least due to the sliding of the piston for rotating in a specific direction so that the take-up shaft is rotated in the taking-up direction, and a sliding member that is engaged with the rotator and causes the rotator to rotate in the specific direction by sliding in a tangential direction with respect to the rotationally circumferential direction of the rotator under the predetermined condition, and whose restricting portion having higher rigidity than the housing portion is formed opposite the sliding member, in such a manner that the cover is connected to the housing portion for covering the rotator and the sliding means, bearing means inside of which either the winding shaft or the rotator is disposed and whose inside diameter size is sufficiently larger than the outside diameter size of the one disposed inside of the take-up shaft and the rotator, and a protrusion which is projectingly formed either on the inner peripheral portion of the bearing means protruding towards the outer peripheral portion of the one disposed inside, or on the outer peripheral portion of the one disposed inside and protruding towards the inner peripheral portion of the bearing means, and which has a very small portion of itself relative to the surface area of the opposite peripheral portion that contacts the opposite peripheral portion.

According to the webbing retractor described above, when the sliding member is slid by the operation of the pretensioner, the sliding member engages with the rotator in such a manner that the rotator is rotated in the specific direction. The rotator that is rotated in the specific direction is mechanically connected to the take-up shaft so as to rotate the take-up shaft in the taking-up direction. As a result, the restraining force of the webbing belt on the body of the occupant is increased.

In the meantime, in the webbing retractor, one of the winding shaft and the rotator is disposed inside the bearing means, and the protrusion, which is formed either on the inner peripheral portion of the bearing means protruding towards the outer peripheral portion of the one disposed inside the bearing means, or on the outer peripheral portion of the one disposed inside the bearing means and protruding towards the inner peripheral portion of the bearing means, has a very small portion of itself relative to the surface area of the opposite peripheral portion that contacts the opposite peripheral portion, so that the one disposed inside the bearing means is supported by the bearing means.

The one disposed inside the bearing means becomes eccentric when the external force along a radial direction of the one disposed inside the bearing means is applied to the one disposed inside the bearing means in a state in which the one disposed inside the bearing means is rotated. As a result, the gap between the inner peripheral portion of the bearing means and the outer peripheral portion of the one disposed inside the bearing means is shortened on the side in the direction of the displacement. At this point, the other one tries to deform the protrusion by pressing the protrusion while rotating relative to either one. However, as the point at which the protrusion is in contact with the other one is very small compared with the area of the other one on the side opposing either one, the pressing force is concentrated on the protrusion, thereby plastically deforming the protrusion with ease. In this way, as the protrusion undergoes plastic deformation easily, resistance of the protrusion to the rotation of the other one becomes relatively small, constituting less hindrance to the rotation of the one disposed inside the bearing means. Therefore, the one disposed inside the bearing means can be rotated smoothly even when the one disposed inside the bearing means becomes eccentric.

Further, as the diameter size of the inner peripheral portion of the bearing means is larger than that of the outer peripheral portion of the one disposed inside the bearing means, there is a space between the inner peripheral portion of the bearing means and the outer periphery of the one disposed inside the bearing means by the side of the protrusion along the rotational direction of the one disposed inside the bearing means. As described above, when the one disposed inside the bearing means is rotated in a state in which it is eccentric, the protrusion is deformed plastically. Then, the plastically deformed portion of the protrusion is dragged in the rotational direction of the other one by the rotation of the other one relative to either one in such a manner that the protrusion is trapped into the above-mentioned space. Therefore, the plastically deformed portion will not hinder the rotation of the one disposed inside the bearing means, which also facilitates the smooth rotation of the one disposed inside the bearing means.

Moreover, in the present invention, the restricting portion that is formed on the cover is given higher rigidity than the housing portion that houses the rotator constituting the pretensioner described above. As a result, if the sliding member should be displaced and abut the restricting portion, further displacement of the sliding member is regulated by the restricting portion. Likewise, if the strength (rigidity) sufficient to withstand abutting of the sliding means is given to the restraining portion, the strength (rigidity) of the housing portion that merely houses the rotator does not need to be so high as than the restricting portion. Accordingly, as in the present invention, when the restricting portion is given higher rigidity than the housing portion, relatively light material, which is also less expensive because of its low rigidity, can be used in the housing portion. For this reason, lightening of weight and reduction in cost of the pretensioner can achieved. As a result, lightening of weight and reduction in cost of the webbing retractor can be achieved.

It should be noted that in the present invention, the above effect is basically produced if the point at which the protrusion comes into contact with the other one is relatively very small in relation to the area of the other one in the portion opposing either one. Therefore, the mode of contact of the protrusion to the other one may be any one of the surface contact, the line contact and the point contact. Judging from the viewpoint that the smaller contact portion is preferable, however, the line contact is preferable to the surface contact.

BRIEF DESCRIPTION OF THE DRAWINGS

FIG. 2 is a typical side view representing a structure of a principal portion of the webbing retractor according to an embodiment of the present invention.

DESCRIPTION OF THE PREFERRED EMBODIMENTS

Figure 1:
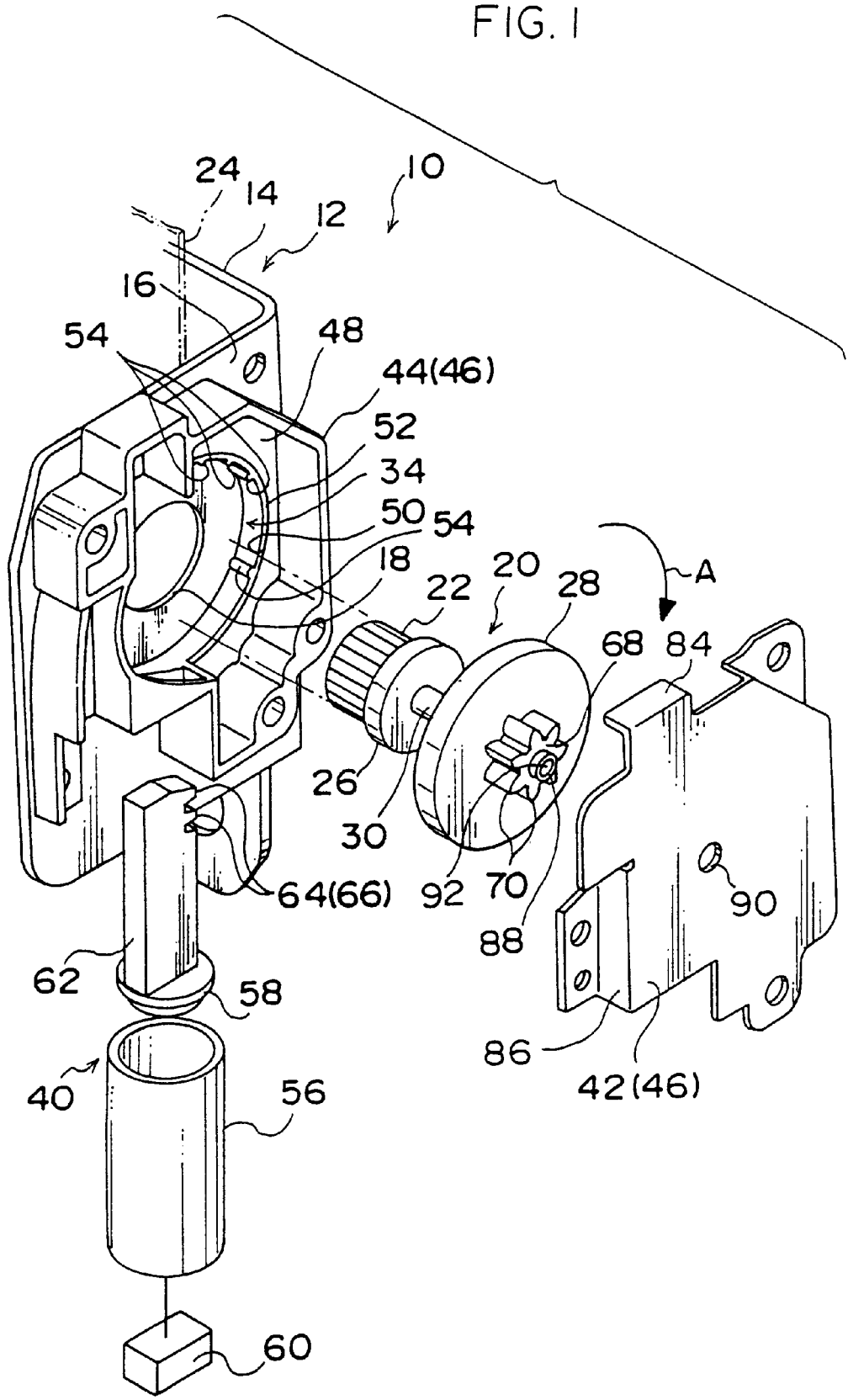
FIG. 1 is an exploded perspective view showing a structure of a principal portion of a webbing retractor according to an embodiment of the present invention.

FIG. 1 shows an exploded perspective view of a webbing retractor 10 according to an embodiment of the present invention. As illustrated in the figure, the webbing retractor 10 is provided with a frame 12. The frame 12 is composed of a base portion 14 that is formed, in the shape of a plate, of metal plate material such as a stainless plate, a side wall portion 16 that is made of metal and is bent at a substantial right angle from one end of the base portion 14 in the transverse direction thereof so as to extend in the direction of the thickness of the base portion 14, and a side wall portion that is not shown in FIG. 1 but extends from the other end of the base portion 14 in parallel with the side wall portion 16.

A circular hole 18 is formed in the side wall portion 16 of the frame 12, through which a take-up shaft 20, whose axial direction is along the transverse direction of the base portion 14 (the direction of the thickness of the side wall portion 16) and which is formed from synthetic resin material having a lower rigidity than the frame 12, is disposed. One end of the take-up shaft 20 in the axial direction thereof is rotatably supported by a bearing portion (not shown) that is provided coaxially with the circular hole 18 on the side wall portion opposing the side wall portion 16 along the direction of the thickness of the side wall portion 16 described above. The other end portion of the take-up shaft 20 in the axial direction thereof, which is opposite the portion supported by the bearing portion, is a webbing anchor portion 22 that has a diameter smaller than the circular hole 18, to which a base end portion of an elongated band-like webbing belt 24 that is shown in FIG. 1 by chain double-dashed lines is fastened. When the take-up shaft 20 is rotated around the axis thereof in the direction indicated by arrow A in FIG. 1, the webbing belt 24 is taken up around the webbing anchor portion 22 of the take-up shaft 20. At this point, the take-up shaft 20 is constantly urged in the direction shown by arrow A in FIG. 1 by urging means (not shown) such as a spiral coil spring, and the take-up shaft 20 is rotated in the direction indicated by arrow A in FIG. 1 in a state in which the external force against the urging force is neither directly nor indirectly applied, thereby taking up the webbing belt 24 forcefully around the webbing anchor portion 22 of the take-up shaft 20.

Further, at the other end of the webbing anchor portion 22 in the axial direction thereof, a flange portion 26 whose diameter is larger than the webbing anchor portion 22 but smaller than the circular hole 18 is formed coaxially with the webbing anchor portion 22, which prevents slippage of the webbing belt 24 along the axial direction of the take-up shaft 20 by abutting an end portion of the webbing belt 24 in the transverse direction thereof when the webbing belt 24 is taken up onto the webbing anchor portion 22.

Moreover, on the side of the other end of the flange portion 26 in the axial direction thereof, a large diameter shaft portion 28 serving as a rotator and having a diameter larger than the circular hole 18 is provided coaxially with the flange portion 26 at a position spaced apart from the flange portion 26 by a predetermined distance. The large diameter shaft portion 28 is integrally connected to the flange portion 26 via a small diameter shaft portion 30 which has a diameter smaller than the webbing anchor portion 22 and is provided coaxially with the flange portion 26 and the large diameter shaft portion 28 between the flange portion 26 and the large diameter shaft portion 28. The large diameter shaft portion 28 is rotatably supported by a bearing portion 32 that serves as bearing means which will be described later. As a result, both ends of the take-up shaft 20 are supported.

Further, the present webbing retractor 10 is provided with a pretensioner 40. The pretensioner 40 is provided with a casing 46 composed of a covering portion 42 which is made of metal and fixed onto the side wall portion 16 by fastening means such as screws, and a casing main body 44 formed from synthetic resin material which has lower rigidity than the covering portion 42 and the side wall portion 16. The casing main body 44 of the casing 46 includes a base portion 48 whose direction of the thickness thereof coincides with the direction of the thickness of the side wall portion 16 and which is disposed adjacent to the side wall portion 16 on the outer side of the side wall portion 16 in the direction of the thickness thereof. On the base portion 48, a hole portion 50 which has a diameter larger than the large diameter shaft portion 28 is formed coaxially with the circular hole 18. At one side of the hole portion 50 from the central portion thereof along the transverse direction of the side wall portion 16, the inside diameter size of the hole portion 50 is slightly larger than the outside diameter size of the outer periphery of the ring-like bearing main body 52 that is projectingly formed and coaxially with the circular hole 18 from the outer end surface of the circular hole 18 in the direction of the thickness thereof. In a state in which the casing main body 44 is mounted in the circular hole 18, the outer peripheral portion of the bearing main body 52 comes in contact with the inner peripheral portion of the hole portion 50.

At this point, not only are the size of the bearing main body 52 in the axial direction thereof and the like set in such a manner that the bearing main body 52 opposes the outer peripheral portion of the large diameter shaft portion 28 along the radial direction thereof in a state in which the take-up shaft 20 is mounted on the frame 12, but also the inside diameter size of the bearing main body 52 is slightly larger than the outside diameter size of the large diameter shaft portion 28, so that when the large diameter shaft portion 28 is disposed coaxially with the bearing main body 52, a space S (see FIG. 2) is formed between the inner peripheral portion of the bearing main body 52 and the outer peripheral portion of the large diameter shaft portion 28.

Further, in the present webbing retractor 10, a plurality of protrusions 54 are formed on the inner peripheral portion of the bearing main body 52. The longitudinal direction of these protrusions 54 is along the axial direction of the bearing main body 52. When seen from the axial direction of the bearing main body 52 (in a state that is illustrated in FIG. 2), these protrusions 54 are in the shape of a semicircle or in the shape of a triangle whose distal end is on the inner side of the bearing main body 52 in the radial direction thereof (in the present embodiment, the protrusions are in a triangular shape), and are formed in a substantially uniform shape along the axial direction of the bearing main body 52. Further, as shown in FIG. 2, the protrusions 54 are not formed at regular intervals along the direction of the inner periphery of the bearing main body 52. If the bearing main body 52 is divided into four equal areas in its circumferential direction (specifically, if the bearing main body 52 is divided into areas from a first to a fourth area along the alternate long and short dash lines in FIG. 2), the protrusions 54 are mainly formed in the area (the first area in FIG. 2) that is axisymmetrical to the area that includes an abutment portion in a state in which teeth 64 of a rack bar 62, which will be described later, mesh with external teeth 70 of a pinion gear 68 (a third area of FIG. 2). (In other words, a larger number of protrusions 54 are formed in the first area than any other area of the second to fourth areas.)

The size from the inner peripheral portion of the hole portion 50 to the end portion of the protrusions 54 on the inner side of the hole portion 50 in the radial direction thereof is mostly equal to the gap of the space S described above. In other words, if the center of the hole portion 50 is used as an axis and a virtual circle is formed by connecting the end portions of the protrusions 54 around the axis, its radius is mostly equal to the outside diameter size of the large diameter shaft portion 28. When the webbing retractor 10 is in a state in which it is being assembled, the end portions of the protrusions 54 come into contact with the outer peripheral portion of the large diameter shaft portion 28, and the bearing main body 52 supports the large diameter shaft portion 28 (in other words, the other end of the take-up shaft 20 in the longitudinal direction thereof) via the protrusions 54. At this point, as mentioned above, when seen from the axial direction of the bearing main body 52 (in the state that is illustrated in FIG. 2), the protrusions 54 are in the shape of a semicircle or in the shape of a triangle whose distal end is on the inner side of the bearing main body 52 in the radial direction thereof. Therefore, the state in which the end portions of the protrusions 54 are brought into contact with the outer peripheral portion of the large diameter shaft portion 28 while the webbing retractor 10 is being assembled is a state in which the end portions of the protrusions 54 are uniformly in line contact with the outer peripheral portion of the large diameter shaft portion 28 along the axial direction of the bearing main body 52.

The pretensioner 40 is provided with a cylinder 56 that serves as gas pressure generating means. The cylinder 56 is disposed in such a manner that the axial direction thereof is perpendicular to the axial direction of the take-up shaft 20 described above, and a piston 58 serving as a sliding member is contained slidably inside thereof. Inside the cylinder 56 and between the piston 58 and a bottom portion of the cylinder 56, a starter, a primer, a boosting agent, a gas generating agent, etc. (none of which are shown) are contained. When the starter is operated and the primer is ignited, the gas generating agent is burned via the boosting agent. As a result, a predetermined amount of gas is generated between the bottom portion of the cylinder 56 and the piston 58 in a very short time. The pressure of the gas forces the piston 58 to slide towards an opening end of cylinder 56.

The cylinder 56 that houses the piston 58 is provided in a predetermined region of a vehicle (not shown) in which the present webbing retractor 10 is installed, and is connected to a sensor 60 directly or indirectly via control means such as a computer or a control circuit. When the sensor 60 detects a predetermined deceleration state that is equivalent to the state in which the vehicle has had a collision, etc., the starter in the cylinder 56 is operated.

On the other hand, a rack bar 62 is provided integrally at the end portion of the cylinder 56 which is opposite to the bottom portion of the cylinder 56. The longitudinal direction of the rack bar 62 is along the axial direction of the cylinder 56, and a gear portion 66 comprised of a plurality of teeth 64 is formed at one end portion of one side of the rack bar in the transverse direction thereof. The teeth 64 of the gear portion 66 are formed in such a manner that they are able to mesh with the external teeth 70 of a pinion gear 68 which is provided coaxially and integrally with the small diameter shaft portion 30 on the other side of the large diameter shaft portion 28 from the small diameter shaft portion 30.

The above-described rack bar 62 is not only disposed in opposition to the large diameter shaft portion 28 along the axial direction of the take-up shaft 20 in the state in which the webbing retractor 10 is being assembled, but is also disposed in a position in which the teeth 64 of the gear portion 66 can mesh with the external teeth 70 of the pinion gear 68 in a state in which the rack bar 62 is slid by a predetermined distance in the opposite direction to the bottom portion of the cylinder 56 along the axial direction of the cylinder 56.

Corresponding to the top end portion of the rack bar 62, a stopper portion 84 serving as a restricting portion is formed on the covering portion 42, which is bent at a substantially right angle from the upper end portion of the covering portion 42 towards the frame 12. Further, a stopper portion 86 serving as a restricting portion is formed on the side opposite the pinion gear 68 via the rack bar 62, which is bent at a substantially right angle from the side end portion of the covering portion 42 towards the frame 12, facing one end portion of the rack bar 62 in the transverse direction thereof.

In the meantime, the pinion gear 68 is connected to the above-mentioned large diameter shaft portion 28 via a one-way clutch 92 so that only the rotation of the pinion gear 68 in the taking-up direction thereof (in the direction indicated by arrow A in FIG. 1) is imparted to the large diameter shaft portion 28 for rotating the large diameter shaft portion 28, and imparting of the rotation the other way around in the direction opposite to the direction in which the large diameter shaft portion 28 is rotated and the pinion gear 68 is taken up (in the direction indicated by arrow A in FIG. 1) is interrupted. It should be noted that in the present embodiment, the one-way clutch 92 is disposed between the pinion gear 68 and the large diameter shaft portion 28. However, it suffices if the one-way clutch 92 is disposed between the pinion gear 68 and the webbing anchor portion 22. Accordingly, the one-way clutch 92 may be disposed, for example, between the large diameter shaft portion 28 and the small diameter shaft portion 30.

Further, a shaft portion 88 is formed in a shaft center of the end surface of the pinion gear 68 on the side opposite to the large diameter shaft portion 28, and is supported by a bearing hole 90 formed on the covering portion 42 and serving as a bearing portion.

Next, a description will be given of operation and effects of the present embodiment.

According to the present webbing retractor 10, when the webbing belt 24 which is taken up onto the webbing anchor portion 22 of the take-up shaft 20 is pulled out so as to be applied to the body of the vehicle occupant, the webbing belt 24 restrains the body of the vehicle occupant by the urging force of urging means (not shown) that is imparted to the take-up shaft 20.

Further, when the sensor 60 detects that the vehicle has entered a sudden deceleration state, the starter in the cylinder 56 is operated so that the gas generating agent is burned via the boosting agent, thereby generating a predetermined amount of gas in the cylinder 56 in a very short time. The pressure of the gas forces the piston 58 to slide in the direction in which it moves away from the bottom portion of the cylinder 56, which in turn causes the rack bar 62 to slide in the direction in which it moves away from the bottom part of the cylinder 56. The sliding movement of the rack bar 62 forces the teeth 64 of the gear portion 66 to mesh with the external teeth 70 of the pinion gear 68. From this state, the rack bar 62 is forced to slide further by the gas pressure described above in the direction in which it moves away from the bottom part of the cylinder 56. As a result, the teeth 64 of the rack bar 62 presses the external teeth 70 of the pinion gear 68 in the direction indicated by arrow F in FIG. 2, thereby rotating the pinion gear 68 in the direction indicated by arrow A in FIG. 2. Thus, the take-up shaft 20 made integral with the pinion gear 68 is forced to rotate by a predetermined amount in the direction indicated by arrow A in FIG. 2, so that the webbing belt 24 is taken up onto the webbing anchor portion 22 by the length corresponding to the rotation amount of the take-up shaft 20. By the taking-up action of the webbing anchor portion 22, the restraining force of the webbing belt 24 on the body of the occupant is increased temporarily, thereby restricting the forward movement of the occupant in the vehicle when the vehicle is in a sudden deceleration state.

When the tooth 64 of the rack bar 62 presses the external tooth 70 of the pinion gear 68, the tooth 64 of the gear portion 66 tries not only to rotate the pinion gear 68 but also to displace the pinion gear 68 along the surface direction of the tooth 64, thereby trying to dislocate (make eccentric) the large diameter shaft portion 28, which is made coaxial and integral with the pinion gear 68, along the surface direction of the tooth 64.

At this point, in the present webbing retractor 10, as described above, when the bearing main body 52 is divided into four equal areas, i.e. from the first area to the fourth area, in its circumferential direction, a larger number of protrusions 54 are formed in the area (the first area) which is axisymmetrical to the area (the third area) that includes the portion where the tooth 64 of the gear portion 66 is in contact with the external tooth 70 of the pinion gear 68, in other words, mostly on the inner peripheral portion of the bearing main body 52 in the portion where the inner peripheral portion of the bearing main body 52 opposes the outer peripheral portion of the large diameter shaft portion 28 along the perpendicular direction of the surface on which the external tooth 70 is in contact with the tooth 64, than the inner peripheral portion corresponding to the other areas. Then, if the large diameter shaft portion 28 is made eccentric, these protrusions 54 are pressed. When the large diameter shaft portion 28 rotates, frictional resistance that is proportionate to the pressing force is generated. Using this frictional resistance, the protrusions 54 try to hinder the rotation of the large diameter shaft portion 28. However, the protrusions 54 are not able to hinder the rotation of the large diameter shaft portion 28 when the take-up shaft 20 rotates in a state in which the pressing force described above is applied because not only is the rigidity of the protrusions 54 lower than that of the larger diameter shaft portion 28 but also the protrusions 54 are merely in line contact with the large diameter shaft portion 28. Then, while the protrusions 54 are dragged in the rotational direction of the take-up shaft 20 by the frictional resistance of the protrusions 54 with the outer peripheral portion of the large diameter shaft portion 28, the protrusions 54 gradually undergo plastic deformation from the tip thereof in the rotational direction of the take-up shaft 20. In this way, in the present embodiment, as the protrusions 54 do not resist but undergo plastic deformation as described above, when the large diameter shaft portion 28 rotates, the take-up shaft 20 can rotate smoothly even when the take-up shaft 20 becomes eccentric.

Further, as described above, the size of the inside diameter of the bearing main body 52 is slightly larger than the size of the outside diameter of the large diameter shaft portion 28 so that the space S (see FIG. 2) is formed between the inner peripheral portion of the bearing main body 52 and the outer peripheral portion of the large diameter shaft portion 28. Therefore, the plastically deformed portions of the protrusions 54, which are dragged by the large diameter shaft portion 28 when the take-up shaft 20 rotates in a state in which the pressing force described above is applied, go into the space S. The plastically deformed portions do not give any resistance to the rotation of the large diameter shaft portion 28, which also facilitates the smooth rotation of the take-up shaft.

As can be seen from the above description, in the present embodiment, as the take-up shaft 20 can rotate smoothly even when the take-up shaft 20 becomes eccentric, the pressure of the gas in the cylinder 56 is efficiently supplied for the rotation of the take-up shaft 20 without being consumed by the frictional resistance between the large diameter shaft portion 28 and the protrusions 54. As a result, not only can the amount of the gas generating agent, the boosting agent and the like contained in the cylinder 56 be reduced but also the size of the cylinder 56 itself can be reduced, thereby allowing the pretensioner 40 to be and contributing to reduction in cost.

Next, a description will be given of operation and effects of the other parts in the present embodiment.

In the present webbing retractor 10, although the rack bar 62 is moved upwardly when the gas is generated in the cylinder 56, the movement of the rack bar 62 by more than a predetermined distance is restricted because the stopper portion 84 abuts the upper end portion of the rack bar 62. As a result, projecting or the like of the rack bar 62 is regulated. At this point, in the present embodiment, since the covering portion 42 is formed of metal, the covering portion 42 has higher rigidity compared with the case when the covering portion 42 is formed of synthetic resin material. Accordingly, the covering portion 42 can reliably receive the rack bar 62 moving upwardly, which, for example, can prevent the rack bar 62 from projecting, etc.

Moreover, when the rack bar 62 meshes with the pinion gear 68, as described above, the teeth 64 of the rack bar 62 press the external teeth 70 of the pinion gear 68 along the surface direction thereof. Therefore, the reaction force from the external teeth 70 of the pinion gear 68 naturally act on the teeth 64 of the rack bar 62, and the reaction force forces the rack bar 62 to displace on the side opposite to the pinion gear 68. At this point, in the present webbing retractor 10, displacement of the rack bar 62 is restricted by the abutting of the stopper portion 86 to the rack bar 62. Moreover, as described above, in the present embodiment, since the covering portion 42 is formed of metal, the covering portion 42 has higher rigidity compared with the case when the covering portion 42 is formed of synthetic resin material. Accordingly, the stopper portion 86 can reliably receive the load that the pinion gear 68 imparts to the rack bar 62, which ensures that the rack bar 62 meshes with the pinion gear 68 in a satisfactory manner.

Further, as can be seen from the above description, in the present webbing retractor 10, since the covering portion 42 is formed of metal, the covering portion 42 has higher rigidity compared with the case when the covering portion 42 is formed of synthetic resin material. Accordingly, the shaft portion 88 can be supported simply by forming the bearing hole 90 in the covering portion 42. In other words, when the covering portion 42 is made of synthetic resin material, a shafting member formed of metal or the like needs to be provided separately due to the lack of strength. In the present embodiment, however, since the covering portion 42 has high rigidity, the shaft portion 88 can be directly supported simply by forming the bearing hole 90. Accordingly, cost can be reduced in terms of the number of parts and processing.

Likewise, since the casing main body 44 that constitutes the casing 46 together with the covering portion 42 is formed of synthetic resin material, not only can the weight of the casing 46 be lightened, but also extraneous sound (hitting sound), which is caused by touching the other metal materials due to the vibration and the like while the vehicle is running, is restricted or prevented.

It should be noted that in the present embodiment described above, the shape of the protrusions 54 is triangular when the protrusions 54 are seen along the axial direction of the bearing main body 52. However, in view of the first aspect of the present invention, it suffices if the portions where the end portions of the protrusions 54 are in contact with the outer peripheral portion of the large diameter shaft portion 28 are very small. Therefore, the contact may be point contact, or may be surface contact, if the portions of contact are very small.

Further, in the present embodiment, the protrusions 54 are formed on the inner peripheral portion of the bearing main body 52 because the rigidity of the bearing main body 52 is lower than that of the large diameter shaft portion 28. Thus, in view of the first aspect of the present invention, when the rigidity of the large diameter shaft portion 28 is lower than that of the bearing main body 52, protrusions that correspond to the protrusions 54 are formed on the outer periphery of the large diameter shaft portion 28.

What is claimed is:

1. A webbing retractor comprising:

a cylinder to which gas is supplied under a predetermined condition;

a piston which is slidably provided within said cylinder, and which slides within said cylinder due to the pressure of the gas;

a take-up shaft to which a base end portion of an elongated band-like webbing belt for restraining the body of an occupant is fixed and which is urged in the taking-up direction in which the webbing belt is taken up;

a pretensioner for rotating said take-up shaft toward the taking-up direction due to the sliding of said piston;

bearing means whose inside diameter size is larger than the outside diameter size of said take-up shaft and which has an inner peripheral portion into which said take-up shaft is coaxially inserted; and a protrusion which is formed either on the inner peripheral portion of said bearing means protruding towards the outer peripheral portion of said take-up shaft, or on the outer peripheral portion of said take-up shaft protruding towards the inner peripheral portion of said bearing means, and which has a very small portion of itself relative to the surface area of the opposite peripheral portion that contacts the opposite peripheral portion.

2. A webbing retractor as claimed in claim 1, wherein said protrusion is formed on the one that has the lower rigidity of the outer peripheral portion of the one disposed inside the bearing means, of said winding shaft and the rotator, and the inner peripheral portion of said bearing means.

3. A webbing retractor as claimed in claim 1, wherein said pretensioner is structured to include;

a pinion gear which is able to rotate around the shaft thereof and which is mechanically connected to the one disposed inside said bearing means of said take-up shaft and the rotator in a state in which the pinion gear rotates at least in a specific direction, so as to impart the rotation in the specific direction to the one disposed inside said bearing means for rotating said take-up shaft in the taking-up direction; and a rack bar which is provided so as to be able to mesh with said pinion gear by a sliding movement thereof in a tangential direction with respect to the outer periphery of the one disposed inside said bearing means, and meshes with said pinion gear by being forced to slide in the tangential direction under the predetermined condition so as to rotate said pinion gear to the specific direction, and said protrusion is formed on the inner peripheral portion of said bearing means on the opposite side from said rack bar via the one disposed inside the bearing means and on the side opposed to the outer peripheral portion of said take-up shaft along a direction perpendicular to a surface on which said rack bar meshes with said pinion gear.

4. A webbing retractor as claimed in claim 1, wherein said protrusion is in the shape of a semicircle or in the shape of a triangle.

5. A webbing retractor as claimed in claim 2, wherein said pretensioner is structured to include;

a pinion gear which is able to rotate around the shaft thereof and which is mechanically connected to the one disposed inside said bearing means of said take-up shaft and the rotator in a state in which the pinion gear rotates at least in a specific direction, so as to impart the rotation in the specific direction to the one disposed inside said bearing means for rotating said take-up shaft in the taking-up direction; and a rack bar which is provided so as to be able to mesh with said pinion gear by a sliding movement thereof in a tangential direction with respect to the outer periphery of the one disposed inside said bearing means, and meshes with said pinion gear by being forced to slide in the tangential direction under the predetermined condition so as to rotate said pinion gear to the specific direction, and said protrusion is formed on the inner peripheral portion of said bearing means on the opposite side from said rack bar via the one disposed inside the bearing means and on the side opposed to the outer peripheral portion of said take-up shaft along a direction perpendicular to a surface on which said rack bar meshes with said pinion gear.

6. A webbing retractor as claimed in claim 2, wherein said protrusion formed projectingly on the one of the outer peripheral portion of the one disposed inside the bearing means, of said winding shaft and the rotator, and the inner peripheral portion of said bearing means is in line contact or in point contact with the opposite peripheral portion.

7. A webbing retractor as claimed in claim 2, wherein the one that has the lower rigidity of the outer peripheral portion of the one disposed inside the bearing means, of the winding shaft and the rotator, and the inner peripheral portion of said bearing means, is formed of synthetic resin.

8. A webbing retractor as claimed in claim 3, wherein, when the inner peripheral portion of said bearing means and the outer peripheral portions of said take-up shaft and the rotator are divided into four equal areas around said winding-shaft, the number of said protrusions that exist in the area which is symmetrical with respect to said take-up shaft to the area including the portion where said pinion gear meshes with said rack bar is larger than the number of said protrusions that exist in the respective other areas.

9. A webbing retractor as claimed in claim 5, wherein, when the inner peripheral portion of said bearing means and the outer peripheral portions of said take-up shaft and the rotator are divided into four equal areas around said winding-shaft, the number of said protrusions that exist in the area which is symmetrical with respect to said take-up shaft to the area including the portion where said pinion gear meshes with said rack bar is larger than the number of said protrusions that exist in the respective other areas.

10. A webbing retractor comprising:

a cylinder to which gas is supplied under a predetermined condition;

a piston which is slidably provided within said cylinder, and which slides within said cylinder due to the pressure of the gas;

a take-up shaft including a shaft main body, to which a base end portion of an elongated band-like webbing belt for restraining the body of an occupant is fixed and which is urged in the taking-up direction in which the webbing belt is taken up;

a pretensioner which has a rotator that is mechanically connected to said take-up shaft at least due to the sliding of said piston, and which causes the rotator to rotate in a specific direction due to the sliding of said piston so that said take-up shaft is rotated in the taking-up direction;

bearing means whose inside diameter size is larger than the outside diameter size of said take-up shaft and inside of which the rotator is disposed; and a protrusion which is projectingly formed either on the inner peripheral portion of said bearing means protruding towards the outer peripheral portion of the rotator, or on the outer peripheral portion of the rotator disposed inside and protruding towards the inner peripheral portion of said bearing means, and which has a very small portion of itself relative to the surface area of the opposite peripheral portion that contacts the opposite peripheral portion.

11. A webbing retractor as claimed in claim 10, wherein said protrusion is formed on the one that has the lower rigidity of the outer peripheral portion of the one disposed inside the bearing means, of said winding shaft and the rotator, and the inner peripheral portion of said bearing means.

12. A webbing retractor as claimed in claim 10, wherein said pretensioner is structured to include;

a pinion gear which is able to rotate around the shaft thereof and which is mechanically connected to the one disposed inside said bearing means of said take-up shaft and the rotator in a state in which the pinion gear rotates at least in a specific direction, so as to impart the rotation in the specific direction to the one disposed inside said bearing means for rotating said take-up shaft in the taking-up direction; and a rack bar which is provided so as to be able to mesh with said pinion gear by a sliding movement thereof in a tangential direction with respect to the outer periphery of the one disposed inside said bearing means, and meshes with said pinion gear by being forced to slide in the tangential direction under the predetermined condition so as to rotate said pinion gear to the specific direction, and said protrusion is formed on the inner peripheral portion of said bearing means on the opposite side from said rack bar via the one disposed inside the bearing means and on the side opposed to the outer peripheral portion of said take-up shaft along a direction perpendicular to a surface on which said rack bar meshes with said pinion gear.

13. A webbing retractor as claimed in claim 10, wherein said protrusion is in the shape of a semicircle or in the shape of a triangle.

14. A webbing retractor as claimed in claim 11, wherein said pretensioner is structured to include;

a pinion gear which is able to rotate around the shaft thereof and which is mechanically connected to the one disposed inside said bearing means of said take-up shaft and the rotator in a state in which the pinion gear rotates at least in a specific direction, so as to impart the rotation in the specific direction to the one disposed inside said bearing means for rotating said take-up shaft in the taking-up direction; and a rack bar which is provided so as to be able to mesh with said pinion gear by a sliding movement thereof in a tangential direction with respect to the outer periphery of the one disposed inside said bearing means, and meshes with said pinion gear by being forced to slide in the tangential direction under the predetermined condition so as to rotate said pinion gear to the specific direction, and said protrusion is formed on the inner peripheral portion of said bearing means on the opposite side from said rack bar via the one disposed inside the bearing means and on the side opposed to the outer peripheral portion of said take-up shaft along a direction perpendicular to a surface on which said rack bar meshes with said pinion gear.

15. A webbing retractor as claimed in claim 11, wherein said protrusion formed projectingly on the one of the outer peripheral portion of the one disposed inside the bearing means, of said winding shaft and the rotator, and the inner peripheral portion of said bearing means is in line contact or in point contact with the opposite peripheral portion.

16. A webbing retractor as claimed in claim 11, wherein the one that has the lower rigidity of the outer peripheral portion of the one disposed inside the bearing means, of the winding shaft and the rotator, and the inner peripheral portion of said bearing means, is formed of synthetic resin.

17. A webbing retractor as claimed in claim 12, wherein, when the inner peripheral portion of said bearing means and the outer peripheral portions of said take-up shaft and the rotator are divided into four equal areas around said winding-shaft, the number of said protrusions that exist in the area which is symmetrical with respect to said take-up shaft to the area including the portion where said pinion gear meshes with said rack bar is larger than the number of said protrusions that exist in the respective other areas.

18. A webbing retractor as claimed in claim 14, wherein, when the inner peripheral portion of said bearing means and the outer peripheral portions of said take-up shaft and the rotator are divided into four equal areas around said winding-shaft, the number of said protrusions that exist in the area which is symmetrical with respect to said take-up shaft to the area including the portion where said pinion gear meshes with said rack bar is larger than the number of said protrusions that exist in the respective other areas.

19. A webbing retractor comprising:
   a cylinder to which gas is supplied under a predetermined condition;
   a piston which is slidably provided within the cylinder, and which slides within the cylinder due to the pressure of the gas;
   a take-up shaft including a shaft main body, to which a base end portion of an elongated band-like webbing belt for restraining the body of an occupant is fixed and which is urged in the taking-up direction in which the webbing belt is taken up;
   a pretensioner which has a cover including a housing portion housing a rotator that is mechanically connected to said take-up shaft at least due to the sliding of said piston for rotating in a specific direction so that said take-up shaft is rotated in the taking-up direction, and also including a bearing portion that is given higher rigidity than the housing portion and supports the rotator, in such a manner that the cover is connected to the housing portion for covering the rotator while the bearing portion supports the rotator;
   bearing means inside of which either the winding shaft or the rotator is disposed and whose inside diameter size is sufficiently larger than the outside diameter size of the one disposed inside of said take-up shaft and the rotator; and
   a protrusion which is projectingly formed either on the inner peripheral portion of said bearing means protruding towards the outer peripheral portion of the one disposed inside, or on the outer peripheral portion of the one disposed inside and protruding towards the inner peripheral portion of said bearing means, and which has a very small portion of itself relative to the surface area of the opposite peripheral portion that contacts the opposite peripheral portion.

20. A webbing retractor comprising:
   a cylinder to which gas is supplied under a predetermined condition;
   a piston which is slidably provided within said cylinder, and which slides within said cylinder due to the pressure of the gas;
   a take-up shaft including a shaft main body, to which a base end portion of an elongated band-like webbing belt for restraining the body of an occupant is fixed and which is urged in the taking-up direction in which the webbing belt is taken up;
   a pretensioner which has a cover including a housing portion housing both a rotator that is mechanically connected to said take-up shaft at least due to the sliding of said piston for rotating in a specific direction so that said take-up shaft is rotated in the taking-up direction, and sliding member that is engaged with the rotator and causes the rotator to rotate in the specific direction by sliding in a tangential direction with respect to the rotationally circumferential direction of the rotator under the predetermined condition, and whose restricting portion having higher rigidity than the housing portion is formed opposite the sliding member, in such a manner that the cover is connected to the housing portion for covering the rotator and the sliding means;
   bearing means inside of which either the winding shaft or the rotator is disposed and whose inside diameter size is sufficiently larger than the outside diameter size of the one disposed inside of said take-up shaft and the rotator; and
   a protrusion which is projectingly formed either on the inner peripheral portion of said bearing means protruding towards the outer peripheral portion of the one disposed inside, or on the outer peripheral portion of the one disposed inside and protruding towards the inner peripheral portion of said bearing means, and which has a very small portion of itself relative to the surface area of the opposite peripheral portion that contacts the opposite peripheral portion.

* * * * *